(12) United States Patent
Rousseau et al.

(10) Patent No.: US 9,863,513 B2
(45) Date of Patent: Jan. 9, 2018

(54) LINEAR ACTUATOR FOR MOTION SIMULATOR

(71) Applicant: D-BOX TECHNOLOGIES INC, Longueuil (CA)

(72) Inventors: Robert Rousseau, Longueuil (CA); Steve Boulais, Longueuil (CA); Pierre Senecal, Longueuil (CA)

(73) Assignee: D-BOX TECHNOLOGIES INC, Québec (CA)

(*) Notice: Subject to any disclaimer, the term of this patent is extended or adjusted under 35 U.S.C. 154(b) by 93 days.

(21) Appl. No.: 14/648,133

(22) PCT Filed: Dec. 2, 2013

(86) PCT No.: PCT/US2013/072609
§ 371 (c)(1),
(2) Date: May 28, 2015

(87) PCT Pub. No.: WO2014/085805
PCT Pub. Date: Jun. 5, 2014

(65) Prior Publication Data
US 2015/0316131 A1  Nov. 5, 2015

Related U.S. Application Data

(60) Provisional application No. 61/731,575, filed on Nov. 30, 2012.

(51) Int. Cl.
*F16H 3/06* (2006.01)
*F16H 25/20* (2006.01)
(Continued)

(52) U.S. Cl.
CPC ............... *F16H 25/20* (2013.01); *F16D 3/68* (2013.01); *F16H 57/023* (2013.01); *H02K 7/06* (2013.01);
(Continued)

(58) Field of Classification Search
CPC ............... F16H 25/20; F16H 57/023; F16H 2025/2031; F16H 2025/2075; F16H 2057/0235; F16D 3/68; H02K 7/06
See application file for complete search history.

(56) References Cited

U.S. PATENT DOCUMENTS 2,247,562 A   5/1940  Santen
4,307,799 A   12/1981 Zouzoulas
(Continued)

FOREIGN PATENT DOCUMENTS

CN   102281930 A   12/2011
DE   3743159 A1    6/1989
(Continued)

OTHER PUBLICATIONS

International Search Report for corresponding application PCT/US2013/072312 filed Dec. 2, 2013; dated Apr. 18, 2014.
(Continued)

*Primary Examiner* — Zakaria Elahmadi
(74) *Attorney, Agent, or Firm* — Cantor Colburn LLP

(57) ABSTRACT

A linear actuator comprises a motor having an output shaft. A casing of the motor has an inner cavity with a counterbore seat surface. A threaded shaft is within the inner cavity. A bearing is received in the counterbore seat surface. A coupling assembly has a first coupling component receiving the rotational output from the motor, and a second coupling component coupled to the first coupling component for transmission of the rotational output to the threaded shaft. A sliding tube is sliding arrangement with the casing for moving in translation relative to the casing. A traveling nut is in the sliding tube for moving therewith for converting a rotational motion of the threaded shaft into a translation of the sliding tube. An integral driven assembly unit comprising the bearing, the threaded shaft, the traveling nut and the sliding tube interconnected to one another so as to be
(Continued)

removable by pulling out the integral driven assembly as a whole from the inner cavity of the casing via the proximal end.

36 Claims, 4 Drawing Sheets

(51) Int. Cl.
   *F16H 57/023* (2012.01)
   *F16D 3/68* (2006.01)
   *H02K 7/06* (2006.01)
   *G09B 9/12* (2006.01)

(52) U.S. Cl.
   CPC ............... *F16H 2025/2031* (2013.01); *F16H 2025/2075* (2013.01); *F16H 2057/0235* (2013.01); *G09B 9/12* (2013.01); *Y10T 29/49817* (2015.01); *Y10T 74/18576* (2015.01)

(56) References Cited

U.S. PATENT DOCUMENTS

| | | | |
|---|---|---|---|
| 5,053,685 A | 10/1991 | Bacci | |
| 5,505,661 A | 4/1996 | Habicht | |
| 5,511,439 A * | 4/1996 | Las Navas Garcia | F16H 25/20 254/98 |
| 6,540,426 B2 | 4/2003 | Cloyd | |
| 6,585,515 B1 | 7/2003 | Roy | |
| 6,772,653 B1 | 8/2004 | Franksson | |
| 7,033,177 B2 | 4/2006 | Kim | |
| 7,141,752 B2 * | 11/2006 | Hochhalter | F16H 25/20 219/86.25 |
| 7,793,561 B2 | 9/2010 | Greilinger | |
| 7,934,773 B2 | 5/2011 | Boulais | |
| 2002/0109427 A1 | 8/2002 | Hochhalter | |
| 2005/0046291 A1 | 3/2005 | Suzuki | |
| 2006/0081078 A1 * | 4/2006 | Nagai | F16H 25/2015 74/89.23 |
| 2006/0144179 A1 | 7/2006 | Greilinger | |
| 2009/0050451 A1 | 2/2009 | Sorensen | |
| 2012/0000304 A1 * | 1/2012 | Hamminga | E05F 15/622 74/89.23 |
| 2012/0168593 A1 | 7/2012 | Mekid | |
| 2012/0227522 A1 | 9/2012 | Wu | |
| 2012/0297908 A1 * | 11/2012 | Bourgoine | F16H 25/20 74/89.23 |
| 2013/0283947 A1 * | 10/2013 | Yamada | F16H 25/2021 74/89.23 |
| 2013/0285494 A1 * | 10/2013 | Iversen | F16H 25/20 310/83 |
| 2014/0013878 A1 * | 1/2014 | Kollreider | A47B 9/04 74/89.35 |
| 2015/0155757 A1 * | 6/2015 | Hidaka | H02K 7/102 310/77 |
| 2015/0222168 A1 * | 8/2015 | Sakai | H02K 49/106 310/93 |

FOREIGN PATENT DOCUMENTS

| | | |
|---|---|---|
| EP | 1057569 A1 | 12/2000 |
| EP | 1820594 A2 | 8/2007 |
| JP | 2004160466 A | 6/2004 |
| WO | 2012077213 A1 | 6/2012 |

OTHER PUBLICATIONS

International Search Report for corresponding application PCT/US2013/072605 filed Dec. 2, 2013; dated Apr. 28, 2014.
International Search Report for corresponding application PCT/US2013/072609 filed Dec. 2, 2013; dated Apr. 28, 2014.
Written Opinion for corresponding application PCT/US2013/072312 filed Dec. 2, 2013; dated Apr. 18, 2014.
Written Opinion for corresponding application PCT/US2013/072605 filed Dec. 2, 2013; dated Apr. 28, 2014.
Written Opinion for corresponding application PCT/US2013/072609 filed Dec. 2, 2013; dated Apr. 28, 2014.
International Preliminary Report on Patentability for corresponding application PCT/US2013/072605 filed Dec. 2, 2013; dated Jun. 11, 2015.
International Preliminary Report on Patentability for corresponding application PCT/US2013/072609 filed Dec. 2, 2013; dated Jun. 11, 2015.
International Preliminary Report on Patentability for corresponding application PCT/US2013/072612 filed Dec. 2, 2013; dated Jun. 11, 2015.

* cited by examiner

LINEAR ACTUATOR FOR MOTION SIMULATOR

CROSS-REFERENCE TO RELATED APPLICATION

The present application claims priority on U.S. Provisional Application Ser. No. 61/731,575, filed on Nov. 30, 2012.

FIELD OF THE APPLICATION

The present application relates to linear actuators as used with motion simulators or in motion simulation, for instance to displace an occupant or occupants of a platform in synchrony with a sequence of video images.

BACKGROUND OF THE ART

In the video and televised entertainment industry, there is an increasing demand for enhancing the viewing experience of a viewer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience.

Electro-mechanical linear actuators are commonly used in such motion platforms. These linear actuators must often be capable of producing low and medium amplitude outputs, at low or medium frequency, for a high number of strokes. Moreover, these linear actuators must support a portion of the weight of a platform and its occupant(s). As a result, these linear actuators are often prone to failure, or must undergo maintenance steps or repairs. In such cases, this results in downtime for the motion platforms. Accordingly, it would be desirable to simplify the construction of linear actuators to facilitate repairs and/or maintenance.

SUMMARY OF THE APPLICATION

It is therefore an aim of the present disclosure to provide a linear actuator that addresses issues associated with the prior art.

Therefore, in accordance with the present application, there is provided a linear actuator comprising: a motor having an output shaft for producing a bi-directional rotational output; a casing connected to the motor at a proximal end, the casing having an inner cavity defining at least a joint surface, and a counterbore seat surface proximal to the joint surface; a threaded shaft within the inner cavity of the casing; at least one bearing within the inner cavity in a proximal portion of the casing, the at least one bearing being received in the counterbore seat surface; a coupling assembly for coupling the output shaft of the motor to the threaded shaft, the coupling assembly having at least a first coupling component receiving the rotational output from the motor, and at least a second coupling component coupled to the first coupling component for transmission of the rotational output to the threaded shaft; a sliding tube in sliding arrangement with the inner cavity of the casing for moving in translation relative to the casing; a traveling nut in the sliding tube for moving therewith, the traveling nut being operatively engaged to the threaded shaft for converting a rotational motion of the threaded shaft into a translation of the sliding tube; and an integral driven assembly unit comprising the bearing, the threaded shaft, the traveling nut and the sliding tube interconnected to one another so as to be removable by pulling out the integral driven assembly as a whole from the inner cavity of the casing via the proximal end.

Further in accordance with the first embodiment, the second coupling component has a cylindrical head, a cylindrical periphery of the cylindrical head being against a surface of an inner race of the bearing.

Still further in accordance with the first embodiment, the cylindrical head has an inner cavity proximally opened and receiving therein a portion of the first coupling component.

Still further in accordance with the first embodiment, the first coupling component comprises a pair of fingers, the pair of fingers projecting into the inner cavity.

Still further in accordance with the first embodiment, the coupling comprises a cross-shaped interface between the pair of fingers and a pair of protrusions in the cavity.

Still further in accordance with the first embodiment, the cross-shaped interface has a hardness lower than that of the fingers and that of the protrusions.

Still further in accordance with the first embodiment, a tubular shaft support projects distally from the cylindrical head, the tubular shaft support receiving therein a proximal end of the threaded shaft.

Still further in accordance with the first embodiment, a pin rotatably locks the tubular shaft support to the proximal end of the threaded shaft.

Still further in accordance with the first embodiment, the casing comprises a counterbore clearance between the joint surface and the counterbore seat surface, the joint surface, the counterbore clearance and the counterbore seat surface being machined with a single end machining from the proximal end of the casing, the sliding tube comprising a proximal flange located within the counterbore clearance, the counterbore clearance defining a distal stop against movement of the sliding tube in a distal direction.

Still further in accordance with the first embodiment, the casing comprises a counterbore shoulder proximal to the counterbore seat surface, the joint surface, the counterbore seat surface and the counterbore shoulder being machined with a single end machining from the proximal end of the casing.

Still further in accordance with the first embodiment, an end ring is received in the counterbore shoulder and releasably secured to the casing, whereby the bearing is retained between the counterbore seat surface and the end ring.

Still further in accordance with the first embodiment, at least one guide projects inwardly from the joint surface, and at least one guide channel in the sliding tube, the at least one guide being received in the at least one guide channel to prevent rotation of the sliding tube relative to the joint surface.

Still further in accordance with the first embodiment, the at least one guide channel is sized so as to delimit a stroke of the sliding tube relative to the casing by contact with the at least one guide.

Still further in accordance with the first embodiment, at least one low-friction sleeve against the joint surface in the inner cavity, the sliding tube sliding against the at least one low-friction sleeve when moving in translation.

Still further in accordance with the first embodiment, an end interface is at a distal end of the sliding tube, the end interface having connection means to connect the linear actuator to a base or to the ground.

Still further in accordance with the first embodiment, the joint surface and the counterbore seat surface are machined with a single end machining from the proximal end of the casing.

In accordance with a second embodiment of the present disclosure, there is provided a method for disassembling a linear actuator, comprising: removing fasteners connecting a motor to a proximal end of a casing of a remainder of the linear actuator; pulling the motor away from a remainder of the linear actuator; removing a retaining component holding a driven assembly unit in the casing of the linear actuator; and pulling out the driven assembly unit as a whole from an inner cavity of the casing via the proximal end, the driven assembly unit comprising at least a bearing, a threaded shaft, a traveling nut and a sliding tube interconnected to one another in the driven assembly unit.

Still further in accordance with the first embodiment, an end interface at a distal end of the sliding tube is removed prior to pulling out the driven assembly unit from the casing.

Still further in accordance with the first embodiment, at least one guide is withdrawn from engagement with the sliding tube prior to pulling out the driven assembly unit from the casing.

DESCRIPTION OF THE PREFERRED EMBODIMENTS

Figure 1:
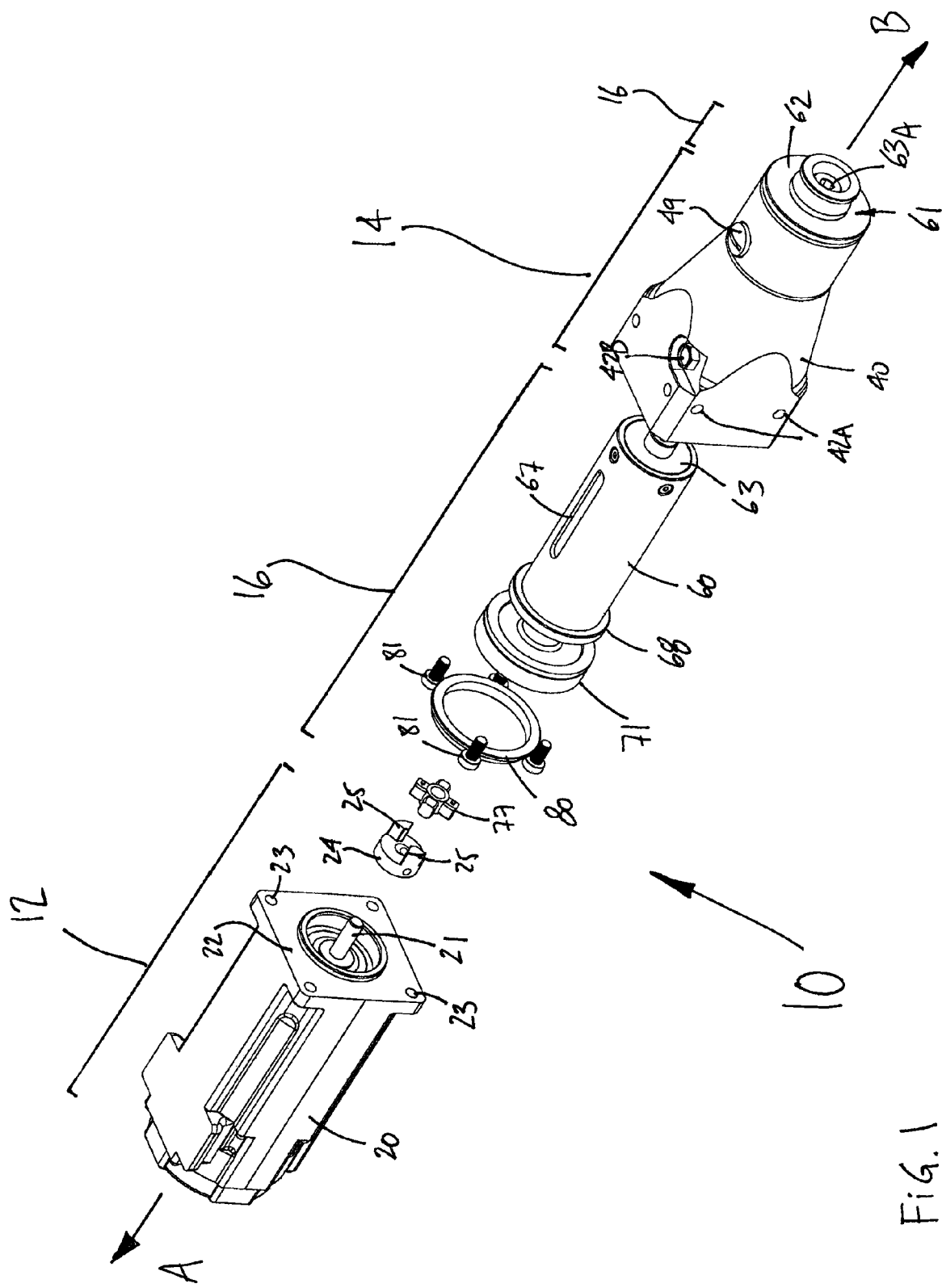
FIG. 1 is an exploded view of a linear actuator for motion simulators in accordance with the present disclosure, showing main assemblies of groups.
Figure 2:
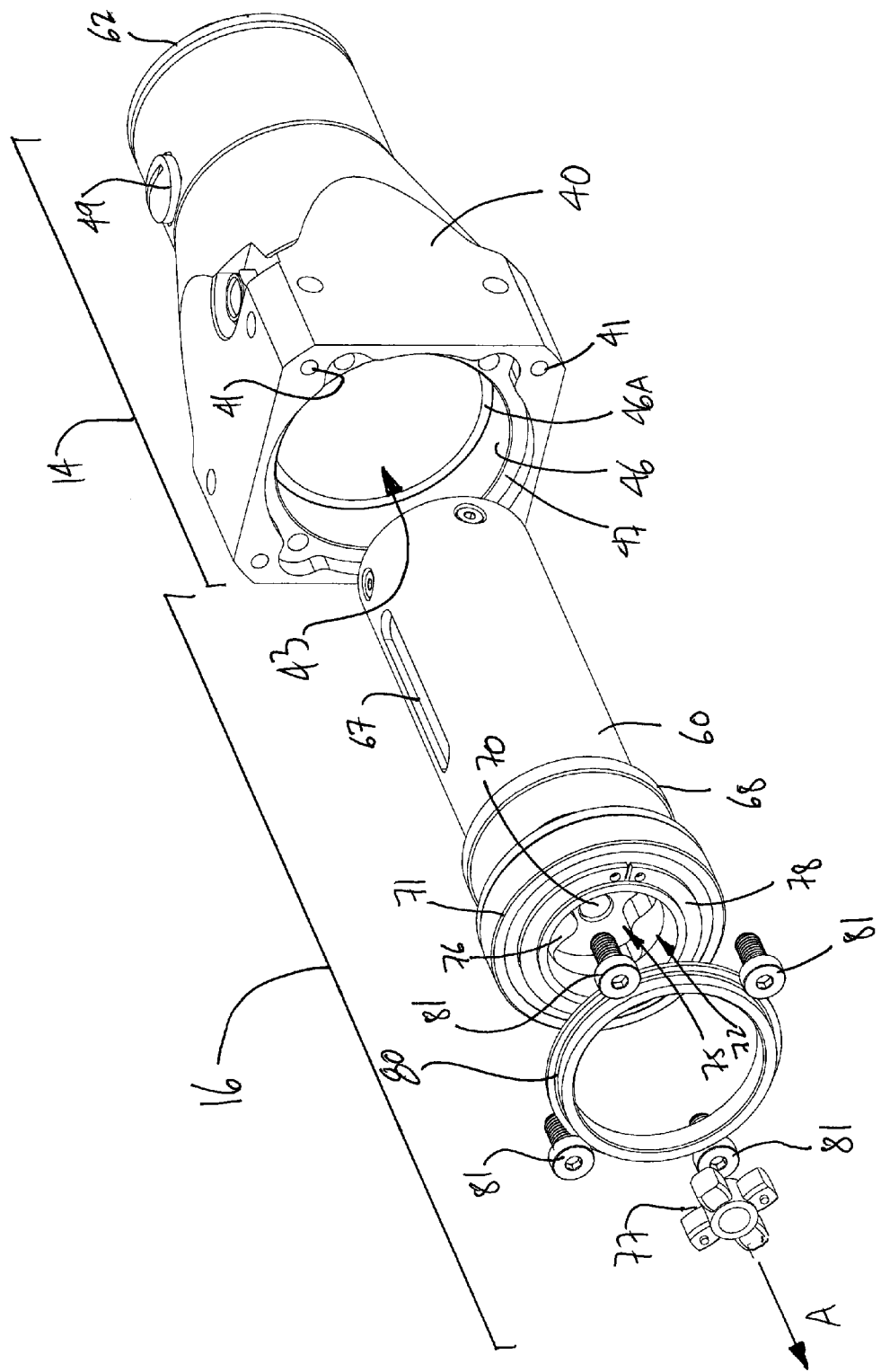
FIG. 2 is an exploded view of a main assembly of a driven group of the linear actuator of FIG. 1 as being removed from a structural group.

Referring to the drawings and more particularly to FIGS. 1 and 2, there is illustrated at 10 a linear actuator of the type used for motion simulators. The linear actuator 10 is well suited to be used between the ground and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, etc. The linear actuator 10 of the illustrated embodiments is an electro-mechanical linear actuator that is driven by a motion controller, or any other appropriate and adapted source of motion signals (e.g., media player, D-cinema projector, internet, etc), i.e., code representing specific motions to be performed. The motion signal is sent to the liner actuator 10 in a suitable format to drive a motor thereof. In an embodiment, at least two of the actuator 10 are used concurrently to support and displace a seat relative to the ground. The linear actuator 10 therefore produces a translational output, along an axial direction thereof. When reference is made hereinafter to the axial direction, it will refer to the longitudinal axis of the linear actuator 10, unless stated otherwise.

The linear actuator 10 is an assembly of three groups (i.e., three portions, three sub-assemblies, etc), namely a motor group 12, a structural group 14 and a driven group 16.

The motor group 12 receives motion signals in electric format, and produces rotational motions corresponding to the motion signals received. The motor group 12 is therefore connected to a source of motion signals.

The structural group 14 houses the driven group 16, and operatively connects the motor group 12 to the driven group 16. Moreover, the structural group 14 may be the interface between the linear actuator 10 and the motion platform, as in the illustrated embodiment.

The driven group 16 converts the rotational motions from the motor group 12 into linear motions, and is the output of the linear actuator 10. The driven group 16 may be the interface between the linear actuator 10 and the ground or a base, as in the illustrated embodiment.

Motor Group 12

Referring to FIGS. 1 and 2, components of the motor group 12 are shown in greater detail. For simplicity purposes, components of the motor group 12 are numbered between 20 and 29.

The motor group 12 has an electric motor 20. The electric motor 20 is a bi-directional motor of the type receiving an electrical motion signal, to convert the signal in a rotational output proportional to the motion signal, in either circular directions, in direct drive. Accordingly, the electric motor 20 has an output shaft 21. By way of example, the electric motor 20 is a Danaher motor. This type of electric motor is provided as an example, and any other appropriate type of motor may be used.

A body of the motor 20 has a connection flange 22 adjacent to the output shaft 21. The connection flange 22 defines throughbores 23 (e.g., tapped throughbores), by which fasteners such as bolts (not shown), washers, and the like may be used to connect the motor 20 to the structural group 14. Any appropriate type of connection means may be used as alternatives to the flange 22 and fasteners.

In the illustrated embodiment, a motor coupler 24 is connected to the output shaft 21 so as to be integral therewith (e.g., by way of a set screw, etc). Hence, the motor coupler 24 rotates with the output shaft 21. The motor coupler 24 will be coupled to the driven group 16 as described hereinafter, or may alternatively be part of the driven group 16. For being coupled, the coupler 24 has a pair of fingers 25 projecting in the axial direction. The fingers 25 are one contemplated configuration for coupling the coupler 24 to the driven group 16.

Structural Group 14

Referring to FIGS. 1 to 4, components of the structural group 14 are shown in greater detail. For simplicity purposes, components of the structural group 14 are numbered between 40 and 49.

The structural group 14 comprises a casing 40, also known as a cover, housing, or the like. In the illustrated embodiment, the casing 40 is a monolithic piece. The casing 40 is a main structural component of the linear actuator 10, as it interfaces the motor group 12 to the driven group 16, and may also interface the linear actuator 10 to a motion platform. As seen in FIG. 5, tapped connection bores 41 are located at a proximal end face of the casing 40, and are circumferentially spaced apart so as to be aligned with the throughbores 23 of the electric motor 20, when the motor 20 is connected to the proximal end of the casing 40, in the manner shown in FIG. 2. As the casing 40 may be the interface of the linear actuator 10 with the motion platform, other connection means may be provided on the surface of the casing 40, such as tapped bores 42A, and a threaded fastener and nut 42B.

Figure 3:
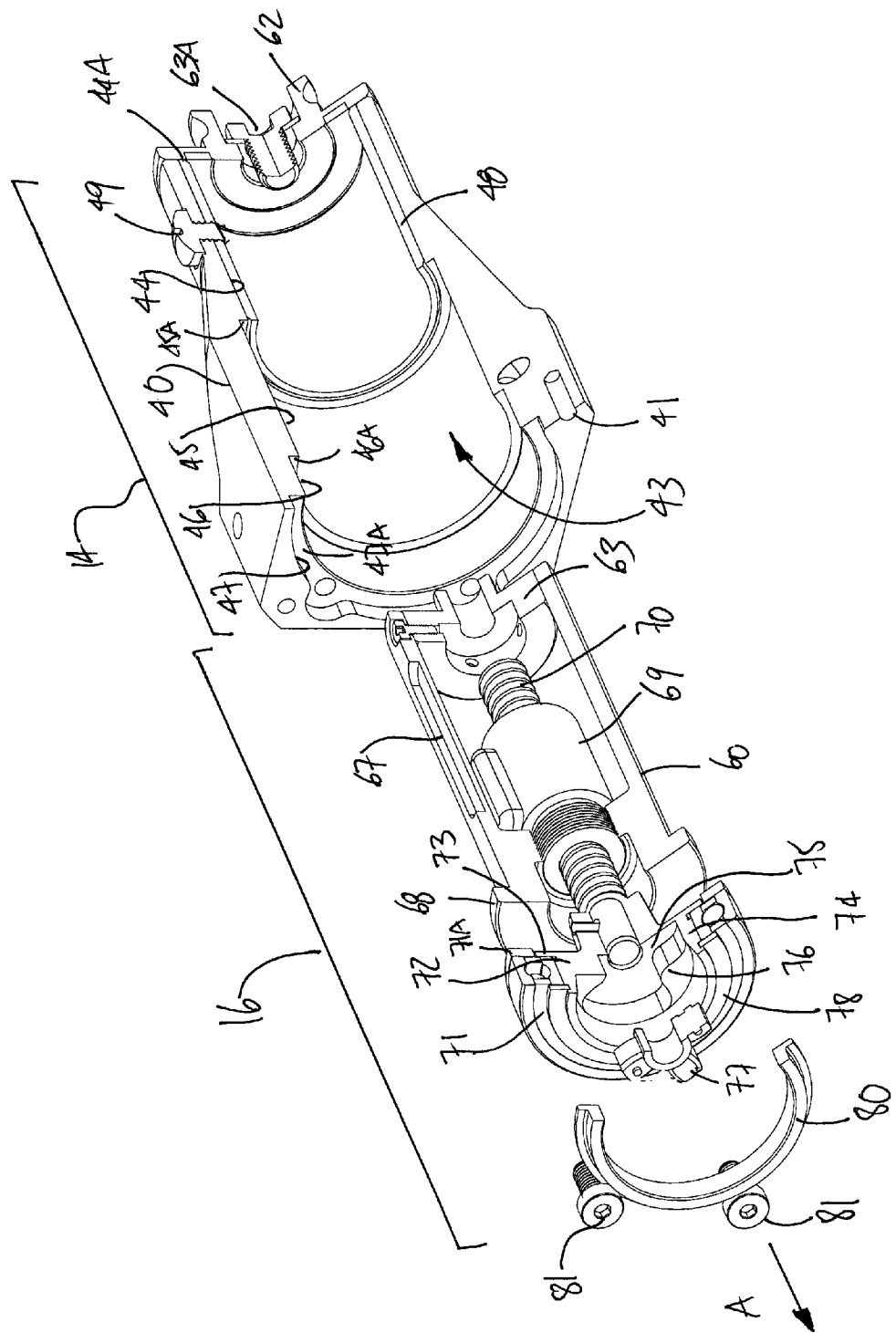
FIG. 3 is an exploded and partly sectioned view of the main assembly of the driven group of the linear actuator of FIG. 2 as being removed from a structural group.

Referring to FIG. 3, the casing 40 defines an inner cavity 43 that houses a part of the driven group 16. The inner cavity 43 may be segmented in various sections, with the various sections being arranged in a counterbore-like sequence. One such section is delimited by a joint surface 44, and an open distal end 44A of the casing 40. The joint surface 44 is the surface against which a moving component of the driven group 16 will slide.

A subsequent section is delimited by a clearance surface 45 and separated from the joint surface 44 by a clearance shoulder 45A, and is hence in a counterbore-like relation with the joint surface 44. The clearance surface 45 forms a void in which components of the driven group 16 may move without obstructions.

Yet another subsequent section is delimited by a seat surface 46 and is separated from the clearance surface 45 by a seat shoulder 46A, and is hence in a counterbore-like relation with the clearance surface 45. The seat surface 46 forms a seat for a bearing of the driven group 16, as described hereinafter.

A final section is open to the proximal end of the casing 40, and is delimited by another clearance surface 47. The clearance surface 47 is separated from the seat surface 46 by a clearance shoulder 47A, and is hence in a counterbore-like relation with the seat surface 46.

Although four different sections have been described above (i.e., the joint surface 44, and the counterbore clearance surface 45, seat surface 46 and other clearance surface 47), it is pointed out that the inner cavity 43 may have fewer sections. For instance, the inner cavity 43 could have at most the joint surface 44, and the seat surface 46, separated by the shoulder. The machining between these two surfaces must be precise and accurate as the joint surface 44 is part of the piston joint, while the seat surface 46 will receive a bearing transmitting a movement of the piston joint.

It is observed that the four different sections have sequentially increasing diameters from a distal-most section, i.e., the section of the joint surface 44, to a proximal-most section, i.e., the section of the clearance surface 47, whereby the inner cavity 43 may be machined from tooling inserted at a single end. Moreover, the sections may be concentric with one another. As the inner cavity 43 of the casing 40 is machined from a single end, i.e., the proximal end of the casing 40, it is possible to machine the inner cavity 43 without modifying the clamping set-up. In other words, a metallic block may be clamped a single time, for the subsequent machining of the inner cavity 43 with different tool heads (e.g., of increasing diameters) to reach the counterbore-like geometry described above of various sections separated by shoulders. For instance, the inner cavity 43 may be machined by plunge milling or drilling, which the casing 40 being in the same clamping set-up throughout the machining of the inner cavity 43. Due to the high precision nature of motion simulation, the single-end machining of the inner cavity 43 represents a cost effective manner to machine the interior of the casing 40. As for the exterior of the casing 40, the tolerances may not be as stringent as for the interior, whereby the exterior of the casing 40 may be cast, or may be machined after a clamping set-up change. It may also be possible to machine a counterbore from the distal end of the casing 40, with a second clamping set-up or an adequate NC machine. However, such a counterbore may not require the precise dimensions required for the joint surface 44 in relation to the seat surface 46, as these two surfaces are used for to produce the output of the linear actuator 10.

Figure 4:
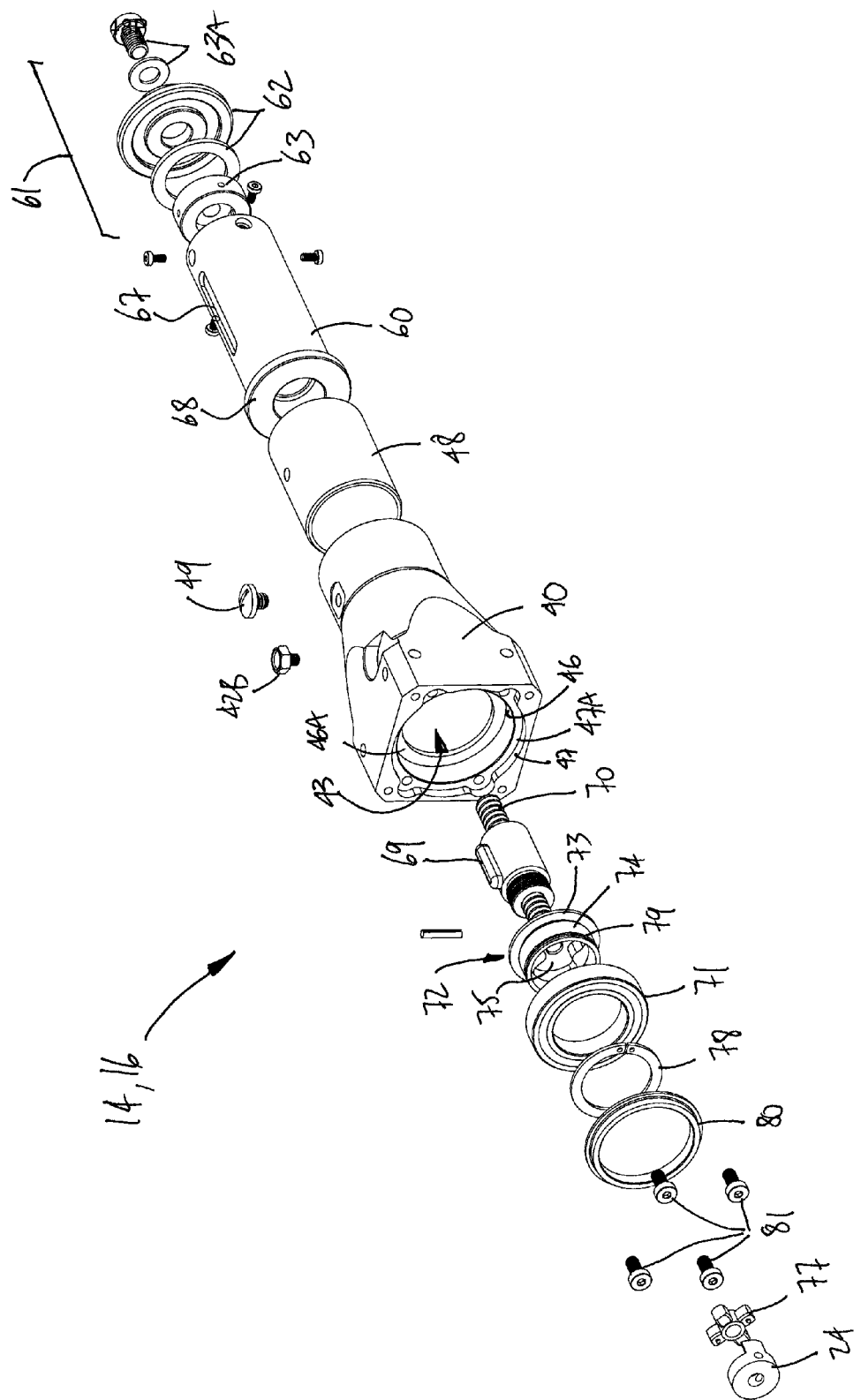
FIG. 4 is an exploded view of the linear actuator of FIG. 1, showing components.

Referring to FIGS. 2-4, a sleeve 48 may be fitted onto the joint surface 44 to act as an interface for a sliding component of the driven group 16, as described hereinafter. The sleeve 48 is hence made of a material having a relatively high hardness for a relatively low coefficient of friction, such as Igus® Iglide® material (e.g., A-500). It is however considered to operate the linear actuator 10 without the sleeve 48 provided appropriate compatible materials are selected for the joint surface 44 and a sliding tube described hereinafter. Guides 49 project through the joint surface 44 and into the inner cavity 43. Ends of the guides 49 are within the inner cavity 43 of the casing 40, and will serve as guides for a sliding component of the driven group 16, to ensure linear motion, i.e., to serve as an anti-rotation guide for the sliding component of the driven group 16. Moreover, the guides 49 may act as stoppers to delimit the stroke of the linear actuator 10. In the illustrated embodiment, the guides are bolts with bolt heads accessible from an exterior of the casing 40.

Driven Group 16

Referring to FIGS. 1 to 4, components of the driven group 16 are shown in greater detail. For simplicity purposes, components of the driven group 16 are numbered above 60.

The driven group 16 has a sliding tube 60, also known as a piston. The sliding tube 60 is the main moving component of the driven group. The sliding tube 60 is fitted within the inner cavity 43 of the casing 40, and is sized so as to be in sliding contact with the sleeve 48 on the joint surface 44. Hence, the sliding tube 60 may move in the axial direction in the inner cavity 43 of the casing 40, such that a distal end of the sliding tube 60 may project out of the distal end of the casing 40 by a variable distance.

In the illustrated, an interface 61 is therefore provided at a distal end of the sliding tube 60, outside of the casing 40. The interface 61 may be a ground or base interface if the linear actuator 10 is oriented with the interface 61 downward. For instance, the interface 61 may lie directly on the ground, or be a part of a joint. Alternatively, if the linear actuator 10 is oriented with the interface 61 upward, the interface 61 is connected to the motion platform (e.g., underside of a seat or seat frame), for instance by way of a joint. The interface 61 is shown in the figures as having a cap 62 with a tapped bore adapted to receive thereon any appropriate component to be used as part of a joint, directly on the ground, directly to a motion platform. The cap 62 is at an end of a support plug 63, and is attached to the plug 63 by a bolt 63A. The support plug 63 is partially received in an inner cavity 64 of the sliding tube 60, and may be secured to the sliding tube 60 by lateral screws, or the like. The cap 62 and the support plug 63 are one solution among many others that can be used as the interface 61 at the end of the sliding tube 60.

Referring to FIG. 3, the inner cavity 64 is shown as extending the full length of the sliding tube 60. An inner wall 65 is located inside the inner cavity 64, and lies in a transverse plane relative to the axial direction. A central bore 66 is centrally located in the inner wall 65. The central bore 66 is shown as being tapped.

On an outer surface of the sliding tube 60, a pair of guide channels 67 are formed. The guide channels 67 are parallel to the axial direction. In operation, ends of the guides 49 will be received in the guide channels 67. In the illustrated embodiment, the sliding tube 60 features a pair of the guide channels 67, with the guide channels 67 being diametrically opposed on the sliding tube 60. However, more or less of the guide channels 67 could be used, with a corresponding number of the guides 49.

The sliding tube 60 may define a flange 68 at its proximal end. During operation, the flange 68 is located in the inner cavity 43, within the section delimited by the clearance surface 45. The outer diameter of the flange 68 is smaller than the inner diameter of the inner cavity 43 at the clearance surface 45. Accordingly, in an embodiment, there is no contact between the clearance surface 45 and the flange 68. The flange 68 may prevent the sliding tube 60 from being inadvertently removed from the casing 40, for instance if the guides 49 are removed. The flange 68 may also come into abutment with the clearance shoulder 45A, to bound the extension of the sliding tube 60 relative to the casing 40.

A traveling nut 69 is secured to the sliding tube 60. In the illustrated embodiment, the traveling nut 69 has a threaded end by which it is screwingly connected to the tapped bore of the inner wall 65 of the sliding tube 60, so as to move integrally with the sliding tube 60. The traveling nut 69 may be any appropriate type of mechanism operating with a lead screw (i.e., threaded shaft) to convert a rotation of the lead screw into a translation of the sliding tube 60. For instance, the traveling nut 69 is a ball screw unit. One suitable ball screw unit is a NSK rolled ball screw with a return tube, such as a RNCT type ball nut. However, many other types of traveling nuts 69 are considered as alternatives to rolled ball screws. For instance, the traveling nut may be an integral part of the sliding tube 60 (e.g., a monolithic machined part).

Referring concurrently to FIG. 3, a threaded shaft (i.e., lead screw, bolt) is in operative engagement with the traveling nut 69. The threaded shaft 70 is coupled to the electric motor 20, to transmit the rotational output of the motor 20 to the sliding tube 60. The threaded shaft 70 has a helical raceway that is compatible with the traveling nut 69. As the traveling nut 69 is fixed to the sliding tube 60, and as the sliding tube 60 is limited to translational movements due to the interaction between the guides 49 and the guide channels 67, a rotation of the threaded shaft 70 results in a translation of the traveling nut 69.

The threaded shaft 70 is rotatably connected to the casing 40, to rotate about its longitudinal axis (substantially parallel to the axial direction), while being retained from translating. A bearing 71 is accordingly seated in the section of the casing 40 delimited by the seat surface 46, with the bearing 71 abutted against the shoulder 46A, for instance with a spacer ring 71A therebetween. The bearing 71 may be a ball bearing, a roller bearing, a ball-less bearing, or any appropriate type of bearing.

A shaft support 72 interconnects the shaft 70 to the bearing 71. In the illustrated embodiment, the shaft support 72 is a monolithic piece of metal that is cast, molded and/or machined. The shaft support 72 has an annular body that receives a proximal end of the shaft 70. The shaft support 72 is fixed to the shaft 70, for instance by set screws radially arranged between the shaft 70 and the shaft support 72, whereby the shaft support 72 rotates with the shaft 70. The shaft support 72 has a distal flange 73 and a proximal head 74. The head 74 has an outer diameter corresponding to the inner diameter of the inner race of the bearing 71, for the bearing 71 to be mounted thereon and to abut the flange 73. The dimensioning of the head 74 is selected so as to reach an appropriate fit with the bearing 71 (e.g., interference fit, force fit), to reduce or remove any play between the bearing 71 and the shaft support 72.

The head 74 has a cavity 75 proximally opened, and forming a shaft coupler, for being coupled to the motor coupler 24. A pair of protrusions 76 are in the open cavity 75 and will be coupled to the fingers 25 of the motor coupler of the motor 20, for transmission of a rotational output from the electric motor 20 to the shaft 70. A joint interface 77 is received in the open cavity 75. The joint interface 77 is cross-shaped, and hence defines four clearances, two of which receive the fingers 25, and two of which receive the protrusions 76. The four clearances of the joint interface 77 are sized so as to minimize or prevent any play with the fingers 35 and the protrusions 76. However, the joint interface 77 is made of a relatively hard material, yet with a hardness lower than that of the metallic material used for the motor coupler 24 and the shaft support 72. For instance, the joint interface 77 is made of a high-density polymeric material. When the linear actuator 10 is assembled in the manner shown in FIGS. 1 to 4, the joint interface 77 is held captive in the open cavity 75, between the motor coupler 24 and the head 74, but is not secured to either. Hence, the joint interface 77 allows some freedom of alignment between the motor coupler 24 and the head 74, for instance if the output shaft 21 of the motor 20 and the threaded shaft 70 are not perfectly aligned. Hence, the joint interface 77 forms a universal-like joint between the motor coupler 24 and the shaft support 72.

An external retaining ring 78 is received in a channel 79 on the outer surface of the head 74. The channel 79 is spaced apart from the flange 73 for the bearing 71 to be held axially captive between the flange 73 and the external retaining ring 78, with substantially no axial play. The external retaining ring 78 is one of a few contemplated solutions to secure the bearing 71 to the shaft support 72, other solutions being a tapped ring, nut, etc.

As best seen in FIG. 3, the bearing 71, the open cavity 75, and the various components forming the joint between the output shaft 21 of the motor 20 and the threaded shaft 70, namely the fingers 25 of the motor coupler 24, the protrusions 76 and the joint interface 77 are all within the axial section of the casing 40 delimited by the seat surface 46. This axial section is relatively narrow, as it is more or less equal to the thickness of the bearing 71. Moreover, the fingers 25, the bearing 71, the protrusions 76 and the joint interface 77 all lie in a common plane that is transverse to the axial direction of the linear actuator 10. The fingers 25, the head 74, the protrusions 76 and the joint interface 77 are all located in a center of the bearing 71.

An end ring 80 is positioned at the proximal end of the driven group 16, and abuts against the outer race of the bearing 71. The end ring 80 holds the various components of the driven group 16 captive in the casing 40. Fasteners 81, such as bolts, have their heads within the section of the casing 40 delimited by the clearance surface 47, and against the shoulder 47A. The heads of the fasteners 81 block the end ring 81 from moving out of the casing 40, in the axial direction.

Now that the various components of the linear actuator 10, a disassembly and subsequent reassembly thereof is set forth.

The linear actuator 10 as described above is configured to allow the three groups, namely the motor group 12, the structure group 14, and the driven group 16, to each be a quasi-integral assembly unit that may be manipulated as a whole, instead of a plurality of detached pieces requiring to be handled individually when disassembling the linear actuator 10. Accordingly, during disassembly and reassembly of the linear actuator 10, the assembly unit of the driven group 16 may be inserted into or separated from the structure group 14 with a reduced number of steps, as the driven group 16 must not be taken apart one component at a time.

In order to remove the motor group 12 from a remainder of the linear actuator 10, the fasteners connecting the motor 20 via the flange 22 and throughbores 23 are removed (e.g., screwed off). Once these fasteners are removed, the motor group 12, including the motor coupler 24 on the output shaft 21, is pulled away from the casing 40 in the axial direction, as shown by direction A. It is pointed out that the casing 40 may be secured to the motion platform, and that the casing 40 need not be separated from the motion platform to remove the motor group 12, provided there is sufficient room to remove the motor group 12 from a remainder of the linear actuator 10. According to an embodiment, a replacement motor 20 may be available and ready for being connected to the structural group 14 and driven group 16, for quickly repairing the linear actuator 10. The motor 20 is wired to a processor and must be disconnected therefrom if the motor 12 must be replaced. Moreover, when attending to the repair or maintenance of the linear actuator 10, care must be taken to avoid electrical hazards.

Once the motor group 12 is removed, the proximal open end of the inner cavity 43 is exposed, as shown in FIG. 2. The main assembly unit of the driven group 16 may be removed. To remove the main assembly unit of the driven group 16, the stoppers 49, which plunge into the inner cavity 43, must be screwed away from engagement with the channels 67. It is observed that the stoppers 49 may remain connected to the casing 40 provided they are sufficiently withdrawn from the channels 67. This step may be performed with a tool corresponding to the stoppers 49, and may be a drill, a screwdriver, for the illustrated embodiment. In other instances, the stoppers 49 may not be present or may not need to be withdrawn, for instance when the stopping is performed by the flange 68 (in which case the channels 67 could extend all the way to the distal end of the sliding tube 60).

The cap 62 must also be detached from the sliding tube 60, if the cap 62 has a greater outer diameter than the diameter of the inner cavity 43, as in FIGS. 1 to 4. The cap is connected to support plug 63 by the bolt 63A. Accordingly, by unfastening the bolt 63A, the cap 62 may be axially pulled off, in direction B. In some instances, the cap 62 is part of a joint exterior to the linear actuator 10, and this arrangement may or may not require some additional maneuvers to detach the cap 62 from the sliding tube 60.

From the proximal end of the casing 40, the end ring 80 is removed. To remove the end ring 80, the bolts 81 are removed from screwing engagement with the casing 40. Once the end ring 80 is removed, with the stoppers 49 withdrawn and the cap 62 pulled off, the main assembly unit of the driven group 16 may be pulled out as a whole from sliding engagement with the casing 40, by being pulled in direction A, or alternatively by pulling the casing 40 away in direction B. As a result, the main assembly unit, including the sliding tube 60, the support plug 63, the traveling nut 69, the threaded shaft 70, the bearing 71 and the shaft support 72, comes out as a whole. According to an embodiment, a replacement assembly unit may be available and ready for insertion into the casing 40, for quickly repairing the linear actuator 10.

In order to reassemble the linear actuator 10, reverse steps are taken.

Now that the disassembly and subsequent reassembly of the linear actuator 10 has been described, an operation thereof is set forth.

The operation will refer to the linear actuator 10 as being oriented such that the interface 61 is facing the ground.

The linear actuator 10 is initially calibrated, in that the position of the sliding tube 60 is known relative to casing 40. This may be done by any appropriate method, including calibration movements when the linear actuator 10 is turned on, as controlled by a platform controller.

The electric motor 20 receives motion signals and will hence produce rotational outputs proportional to the motion signals, in the selected directions. The rotational outputs will be transmitted through the output shaft 21, to the threaded shaft 70 via the coupling therebetween.

The sliding tube 60 and traveling nut 69 will convert rotations of the threaded shaft 70 into a translation of the sliding tube 60 along the axial direction. As the sliding tube 60 is connected to the ground or a base, the resulting action will be a translational motion of the motor and casing 40 relative to the ground or a base. As the motion platform is connected to the motor 20 or the casing 40, the motion platform will move with the motor 20 and the casing 40. It is pointed out that additional degrees of freedom may be present between any of ground/base, the motor 20/casing 40, and the sliding tube 60, for instance by the presence of joints between the motion platform, the ground/base and the linear actuator 10.

In instances, the sliding tube 60 is connected to the motion platform while the motor 20 and the casing 40 are secured to the ground or to a base. In such a case, the motion platform will move with the sliding tube 60.

The invention claimed is:

1. A linear actuator comprising:
   a motor having an output shaft for producing a bi-directional rotational output;
   a casing connected to the motor at a proximal end and having connection portions on an outer surface thereof configured for fixing the linear actuator to a structure or apparatus, the casing having an inner cavity defining at least a joint surface, and an abutment seat surface proximal to the joint surface;
   a threaded shaft within the inner cavity of the casing;
   at least one bearing within the inner cavity in a proximal portion of the casing, the at least one bearing being received against the abutment seat surface;
   a coupling assembly for coupling the output shaft of the motor to the threaded shaft for transmission of the rotational output to the threaded shaft, the coupling assembly having at least a first coupling component receiving the rotational output from the motor, and at least a second coupling component coupled to the first coupling component for transmission of the rotational output to the threaded shaft, the second coupling component having a cylindrical head, a cylindrical periphery of the cylindrical head being against a surface of an inner race of the bearing;
   a sliding tube in sliding arrangement with the inner cavity of the casing for moving in translation relative to the casing;
   a traveling nut connected to the sliding tube for moving therewith, the traveling nut being operatively engaged to the threaded shaft for converting a rotational motion of the threaded shaft into a translation of the sliding tube; and
   an integral driven assembly unit comprising at least the bearing, the threaded shaft, the traveling nut and the sliding tube interconnected to one another so as to be removable by pulling out the integral driven assembly as a whole from the inner cavity of the casing via the proximal end while the casing remains fixed to the structure or apparatus.

2. The linear actuator according to claim 1, the cylindrical head has an inner cavity proximally opened and receiving therein a portion of the first coupling component.

3. The linear actuator according to claim 2, wherein the first coupling component comprises a pair of fingers, the pair of fingers projecting into the inner cavity.

4. The linear actuator according to claim 3, comprising the coupling assembly comprises a cross-shaped interface between the pair of fingers and a pair of protrusions in the cavity.

5. The linear actuator according to claim 4, wherein the cross-shaped interface has a hardness lower than that of the fingers and that of the protrusions.

6. The linear actuator according to claim 1, further comprising a tubular shaft support projecting distally from the cylindrical head, the tubular shaft support receiving therein a proximal end of the threaded shaft.

7. The linear actuator according to claim 6, further comprising a pin rotatably locking the tubular shaft support to the proximal end of the threaded shaft.

8. The linear actuator according to claim 1, wherein the abutment seat surface is defined by a counterbore, wherein the casing comprises a counterbore clearance between the joint surface and the abutment seat surface, the joint surface, the counterbore clearance and the abutment seat surface being machined with a single end machining from the proximal end of the casing, the sliding tube comprising a proximal flange located within the counterbore clearance, the counterbore clearance defining a distal stop against movement of the sliding tube in a distal direction.

9. The linear actuator according to claim 1, wherein the casing comprises a counterbore shoulder proximal to the abutment seat surface, the joint surface, the abutment seat surface and the counterbore shoulder being machined with a single end machining from the proximal end of the casing.

10. The linear actuator according to claim 7, further comprising an end ring received in the counterbore shoulder and releasably secured to the casing, whereby the bearing is retained between the abutment seat surface and the end ring.

11. The linear actuator according to claim 1, further comprising at least one guide projecting inwardly from the joint surface, and at least one guide channel in the sliding tube, the at least one guide being received in the at least one guide channel to prevent rotation of the sliding tube relative to the joint surface.

12. The linear actuator according to claim 11, wherein the at least one guide channel is sized so as to delimit a stroke of the sliding tube relative to the casing by contact with the at least one guide.

13. The linear actuator according to claim 1, further comprising at least one low-friction sleeve against the joint surface in the inner cavity, the sliding tube sliding against the at least one low-friction sleeve when moving in translation.

14. The linear actuator according to claim 1, further comprising an end interface at a distal end of the sliding tube, the end interface having connection means to connect the linear actuator to a base or to the ground.

15. The linear actuator according to claim 1, wherein the joint surface and the abutment seat surface are machined with a single end machining from the proximal end of the casing.

16. A linear actuator comprising:
a motor having an output shaft for producing a bi-directional rotational output;
a casing connected to the motor at a proximal end and having connection portions on an outer surface thereof configured for fixing the linear actuator to a structure or apparatus, the casing having an inner cavity defining at least a joint surface, and an abutment seat surface proximal to the joint surface;
a threaded shaft within the inner cavity of the casing;
at least one bearing within the inner cavity in a proximal portion of the casing, the at least one bearing being received against the abutment seat surface;
a coupling assembly for coupling the output shaft of the motor to the threaded shaft for transmission of the rotational output to the threaded shaft;
a sliding tube in sliding arrangement with the inner cavity of the casing for moving in translation relative to the casing;
a traveling nut connected to the sliding tube for moving therewith, the traveling nut being operatively engaged to the threaded shaft for converting a rotational motion of the threaded shaft into a translation of the sliding tube; and
an integral driven assembly unit comprising at least the bearing, the threaded shaft, the traveling nut and the sliding tube interconnected to one another so as to be removable by pulling out the integral driven assembly as a whole from the inner cavity of the casing via the proximal end while the casing remains fixed to the structure or apparatus,
wherein the abutment seat surface is defined by a counterbore, wherein the casing comprises a counterbore clearance between the joint surface and the abutment seat surface, the joint surface, the counterbore clearance and the abutment seat surface being machined with a single end machining from the proximal end of the casing, the sliding tube comprising a proximal flange located within the counterbore clearance, the counterbore clearance defining a distal stop against movement of the sliding tube in a distal direction.

17. The linear actuator according to claim 16, wherein the casing comprises a counterbore shoulder proximal to the abutment seat surface, the joint surface, the abutment seat surface and the counterbore shoulder being machined with a single end machining from the proximal end of the casing.

18. The linear actuator according to claim 17, further comprising an end ring received in the counterbore shoulder and releasably secured to the casing, whereby the bearing is retained between the abutment seat surface and the end ring.

19. The linear actuator according to claim 16, further comprising at least one guide projecting inwardly from the joint surface, and at least one guide channel in the sliding tube, the at least one guide being received in the at least one guide channel to prevent rotation of the sliding tube relative to the joint surface.

20. The linear actuator according to claim 19, wherein the at least one guide channel is sized so as to delimit a stroke of the sliding tube relative to the casing by contact with the at least one guide.

21. The linear actuator according to claim 16, further comprising at least one low-friction sleeve against the joint surface in the inner cavity, the sliding tube sliding against the at least one low-friction sleeve when moving in translation.

22. The linear actuator according to claim 16, further comprising an end interface at a distal end of the sliding tube, the end interface having connection means to connect the linear actuator to a base or to the ground.

23. A linear actuator comprising:
a motor having an output shaft for producing a bi-directional rotational output;
a casing connected to the motor at a proximal end and having connection portions on an outer surface thereof configured for fixing the linear actuator to a structure or apparatus, the casing having an inner cavity defining at least a joint surface, and an abutment seat surface proximal to the joint surface;

a threaded shaft within the inner cavity of the casing;

at least one bearing within the inner cavity in a proximal portion of the casing, the at least one bearing being received against the abutment seat surface;

a coupling assembly for coupling the output shaft of the motor to the threaded shaft for transmission of the rotational output to the threaded shaft;

a sliding tube in sliding arrangement with the inner cavity of the casing for moving in translation relative to the casing;

a traveling nut connected to the sliding tube for moving therewith, the traveling nut being operatively engaged to the threaded shaft for converting a rotational motion of the threaded shaft into a translation of the sliding tube; and an integral driven assembly unit comprising at least the bearing, the threaded shaft, the traveling nut and the sliding tube interconnected to one another so as to be removable by pulling out the integral driven assembly as a whole from the inner cavity of the casing via the proximal end while the casing remains fixed to the structure or apparatus, wherein the casing comprises a counterbore shoulder proximal to the abutment seat surface, the joint surface, the abutment seat surface and the counterbore shoulder being machined with a single end machining from the proximal end of the casing.

24. The linear actuator according to claim 23, further comprising an end ring received in the counterbore shoulder and releasably secured to the casing, whereby the bearing is retained between the abutment seat surface and the end ring.

25. The linear actuator according to claim 23, further comprising at least one guide projecting inwardly from the joint surface, and at least one guide channel in the sliding tube, the at least one guide being received in the at least one guide channel to prevent rotation of the sliding tube relative to the joint surface.

26. The linear actuator according to claim 25, wherein the at least one guide channel is sized so as to delimit a stroke of the sliding tube relative to the casing by contact with the at least one guide.

27. The linear actuator according to claim 23, further comprising at least one low-friction sleeve against the joint surface in the inner cavity, the sliding tube sliding against the at least one low-friction sleeve when moving in translation.

28. The linear actuator according to claim 23, further comprising an end interface at a distal end of the sliding tube, the end interface having connection means to connect the linear actuator to a base or to the ground.

29. A linear actuator comprising:
a motor having an output shaft for producing a bi-directional rotational output;
a casing connected to the motor at a proximal end and having connection portions on an outer surface thereof configured for fixing the linear actuator to a structure or apparatus, the casing having an inner cavity defining at least a joint surface, an abutment seat surface proximal to the joint surface, and at least one guide projecting inwardly from the joint surface;
a threaded shaft within the inner cavity of the casing;
at least one bearing within the inner cavity in a proximal portion of the casing, the at least one bearing being received against the abutment seat surface;
a coupling assembly for coupling the output shaft of the motor to the threaded shaft for transmission of the rotational output to the threaded shaft;
a sliding tube in sliding arrangement with the inner cavity of the casing for moving in translation relative to the casing, and at least one guide channel in the sliding tube, the at least one guide being received in the at least one guide channel to prevent rotation of the sliding tube relative to the joint surface;
a traveling nut connected to the sliding tube for moving therewith, the traveling nut being operatively engaged to the threaded shaft for converting a rotational motion of the threaded shaft into a translation of the sliding tube; and
an integral driven assembly unit comprising at least the bearing, the threaded shaft, the traveling nut and the sliding tube interconnected to one another so as to be removable by pulling out the integral driven assembly as a whole from the inner cavity of the casing via the proximal end while the casing remains fixed to the structure or apparatus.

30. The linear actuator according to claim 29, wherein the at least one guide channel is sized so as to delimit a stroke of the sliding tube relative to the casing by contact with the at least one guide.

31. The linear actuator according to claim 29, further comprising at least one low-friction sleeve against the joint surface in the inner cavity, the sliding tube sliding against the at least one low-friction sleeve when moving in translation.

32. The linear actuator according to claim 29, further comprising an end interface at a distal end of the sliding tube, the end interface having connection means to connect the linear actuator to a base or to the ground.

33. The linear actuator according to claim 29, wherein the joint surface and the abutment seat surface are machined with a single end machining from the proximal end of the casing.

34. A linear actuator comprising:
a motor having an output shaft for producing a bi-directional rotational output;
a casing connected to the motor at a proximal end and having connection portions on an outer surface thereof configured for fixing the linear actuator to a structure or apparatus, the casing having an inner cavity defining at least a joint surface, and an abutment seat surface proximal to the joint surface;
a threaded shaft within the inner cavity of the casing;
at least one bearing within the inner cavity in a proximal portion of the casing, the at least one bearing being received against the abutment seat surface;
a coupling assembly for coupling the output shaft of the motor to the threaded shaft for transmission of the rotational output to the threaded shaft;
a sliding tube in sliding arrangement with the inner cavity of the casing for moving in translation relative to the casing;
a traveling nut connected to the sliding tube for moving therewith, the traveling nut being operatively engaged to the threaded shaft for converting a rotational motion of the threaded shaft into a translation of the sliding tube;

at least one low-friction sleeve against the joint surface in the inner cavity, the sliding tube sliding against the at least one low-friction sleeve when moving in translation; and an integral driven assembly unit comprising at least the bearing, the threaded shaft, the traveling nut and the sliding tube interconnected to one another so as to be removable by pulling out the integral driven assembly as a whole from the inner cavity of the casing via the proximal end while the casing remains fixed to the structure or apparatus.

35. The linear actuator according to claim 34, further comprising an end interface at a distal end of the sliding tube, the end interface having connection means to connect the linear actuator to a base or to the ground.

36. The linear actuator according to claim 34, wherein the joint surface and the abutment seat surface are machined with a single end machining from the proximal end of the casing.

* * * * *